Jan. 28, 1930.  J. J. CARNEY  1,745,149
COMPENSATING APPARATUS FOR THERMOELECTRIC COUPLES
Filed Nov. 2, 1927
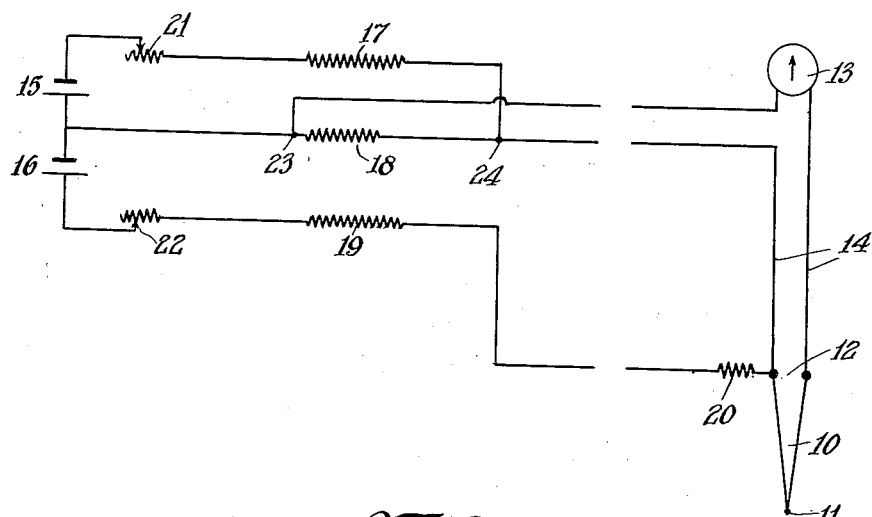
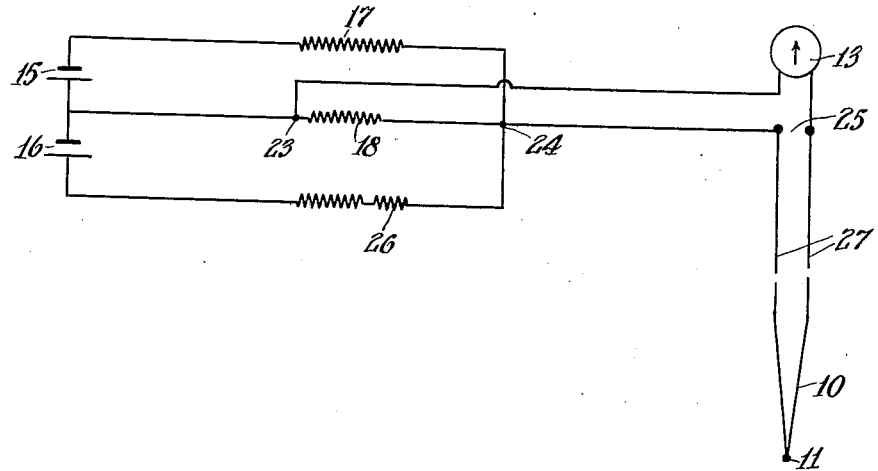
Inventor
John J. Carney
By his Attorney Patented Jan. 28, 1930

1,745,149

UNITED STATES PATENT OFFICE

JOHN J. CARNEY, OF WATERBURY, CONNECTICUT, ASSIGNOR TO THE BRISTOL COMPANY, OF WATERBURY, CONNECTICUT, A CORPORATION OF CONNECTICUT

COMPENSATING APPARATUS FOR THERMOELECTRIC COUPLES

Application filed November 2, 1927. Serial No. 230,586.

The invention relates to electrical measuring apparatus, more particularly apparatus utilizing a thermoelectric couple whose variations in voltage generated under differences in temperature between its cold and warm ends are indicated or recorded on a suitable measuring instrument connected therewith. In the operation of a thermoelectric couple, it is well understood that variations of temperature at the cold end of said couple will affect the accuracy of indication through corresponding change in the voltage generated by the couple; and, consequently, some means must be provided for compensating for such changes of temperature of the cold end of a couple. Various expedients have been suggested for this purpose, for example, a resistance-varying member such as the device set forth in a prior U. S. Patent No. 783,503 granted William H. Bristol the 28th day of February, 1905.

The present invention has for its object a compensating arrangement for the cold ends of a thermoelectric couple utilizing the variation, due to a change of temperature, of a resistance located in proximity to the cold ends of the couple, said novel device being more simple to construct and to calibrate than the one hereinbefore referred to and admitting, also, of the ready application of the same to different types of couples, it being necessary merely to correspondingly alter a neutral resistance element. In carrying out the invention, two substantially balanced circuits are employed, the same including a resistance element common to both through which normally no current or a current of predetermined value flows; and resistance in one of the balanced circuits is arranged to be exposed to the temperature variations to which the cold end of the couple is subjected. By this arrangement, a change of temperature occurring at the said cold end will effect an unbalancing or change of the circuit conditions with consequent change of current flowing through the neutral resistance portion and thereby change the drop of potential across the same. This drop is utilized to balance the variation in potential of the thermoelectric couple caused by the temperature variations, it being understood that the neutral resistance is to be arranged in series with said couple.

The nature of the invention, however, will best be understood when described in connection with the accompanying drawings, in which:—

Fig. 1 illustrates diagrammatically the novel compensating device and circuits employed therein.

Fig. 2 is a similar diagrammatic representation illustrating the arrangement wherein the cold end of the couple is extended substantially to the measuring instrument with the compensating device located at the latter.

Referring to the drawings, more particularly to Fig. 1 thereof, 10 designates a thermoelectric couple of any well known or special type embodying two elements joined at the "hot" end or junction 11 which is usually located at a point the temperature of which it is desired to ascertain. The opposite ends of the couple elements are separated and constitute the so-called "cold" end 12 of the thermoelectric couple, the potential set up by said couple being determined by the difference of the temperatures prevailing at the two ends 11 and 12 which may thus be indicated or recorded upon a suitable measuring instrument 13 such as millivoltmeter, potentiometer, etc., and to which the leads 14 from the cold ends are connected, as hereinafter set forth. It will be understood, therefore, that any change in temperature at the cold end 12 of the couple will ordinarily result in an incorrect indication being given by the instrument 13 of the temperature prevailing at the hot end 11 of said couple; and to this end the compensating means forming the subject of this invention are provided.

These means consist of two substantially balanced circuits, each including a resistance, preferably of like value at predetermined temperature, and a source of potential which may comprise any convenient source of power of a substantially constant potential, for example, ordinary dry cells 15 and 16, respectively. The circuit including the cell 15 is closed through one of the said resistances, as the resistance 17, and a further resistance 18 common to both of the balanced circuits; while the other of said circuits including the source of potential 16 is closed through the divided resistance 19 and 20, and one of the leads 14 from said thermoelectric couple as well as the common resistance 18. The said couple 10 and instrument 13 are connected in series and preferably across the common or neutral resistance 18, so that any current flowing through said resistance will cause a corresponding drop of potential therein to affect the indication of the measuring instrument 13. This flow of current with consequent potential drop may be set up by an unbalancing or change of resistance conditions of one of the balanced circuits, as the circuit including the source of potential 16. A portion 20 of the resistance therein is to this end located in close proximity to the cold end 12 of the couple so as to be exposed to any change in temperature existing at this point and correspondingly affected thereby either to increase or decrease the resistance, and, in turn, unbalance the two interconnected circuits hereinbefore described. This, of course, will cause current to flow through the resistance 18, or change its value, and develop or change a potential drop across the same whose effect is utilized to counteract the effect caused by the said change of temperature at the cold end 12 and thus compensate therefor.

The sources 15 and 16 of potential are preferably of equal value; or, they may be made so, or the resistances 17 and 19—20 accommodated to substantially balance their two circuits or allow for a predetermined flow, by means of suitable adjustable resistances 21 and 22 of negligible temperature coefficient and included in the respective circuits, as is well understood.

The resistances 17, 18 and 19 are preferably composed of material such as a copper-nickel alloy, known commercially as "constantan" which has a negligible temperature co-efficient unless, of course, the said resistance can be maintained always at a constant temperature; while the variable resistance-portion 20 is of material, such as nickel or the like, which has a comparatively high positive temperature coefficient; or, the entire resistance element 19—20 may be composed of this metal, if desired, and especially if it and the resistance 17 is comparatively high. Under these conditions, the entire resistance 19—20 of the one branch would, of course, be located at the cold end of the couple.

I have found that for a change in temperature of 100° F. at the cold ends of a couple composed of iron and constantan, there is a resultant counter E. M. F. set up amounting to 2.92 millivolts and with the resistance 18 of a value of 9 ohms and the variable resistance 20 of a value of 50 ohms, the change in resistance produced in the latter by the said temperature variation at the cold ends will unbalance the two circuits to an extent such that the potential drop across the resistance 18 at the terminals 23 and 24 will amount to approximately 2.92 millivolts and thus make up or compensate for the loss at the cold end 12 of the couple. The resistances 17 and 19 are relatively high compared to the resistance 18. For different couples and in which the counter E. M. F. thereof is less, the corresponding value of the resistance 18 is less so that the proportionate voltage drop therethrough is accordingly decreased, and vice versa. The values of the resistances 17, 19 and 20 are dependent on the values of the sources 15 and 16 of potential employed, as well as upon the value of the resistance 18 which, in turn, conforms to the resistance of the measuring instrument 13 and couple 10 with which said resistance 18 is in series.

In instances where the cold end 12 of the couple has been transferred substantially to the instrument as at the terminals 25, Fig. 2 of the drawings, the variable resistance portion 26 of the compensating device may be located substantially at the instrument in proximity to said cold ends. The transfer of the cold end 12 to the instrument may be accomplished by the use of compensated leads 27. as is more fully set forth in a U. S. Patent No. 764,177 granted to William H. Bristol the 5th of July, 1904.

I claim:

1. The combination with a thermoelectric couple and a measuring instrument connected in series therewith: of compensating means for the said couple, comprising a closed suitably energized circuit, a relatively high resistance and a common resistance located therein; a second closed suitably energized circuit in substantial balance with the first-named circuit and including the said common resistance thereof and a further relatively high resistance exposed to the cold-end temperature of said thermoelectric couple; and leads permanently connecting the said common resistance in series with the said couple and measuring instrument.

2. The combination with a thermoelectric couple and a measuring instrument connected in series therewith: of compensating means for the said couple, comprising a closed circuit including a source of potential, a relatively high resistance and a common resistance; a second closed circuit and including a source of equal potential, the said common resistance and a further relatively high resistance of value equal to the relatively high resistance of the first-named circuit and exposed to the cold-end temperature of said thermoelectric couple; and leads permanently connecting the said common resistance in series with the said couple and measuring instrument.

In testimony whereof I affix my signature.

JOHN J. CARNEY.